United States Patent [19]

Hayes et al.

[11] Patent Number: 5,201,240
[45] Date of Patent: Apr. 13, 1993

[54] VEHICLE CONTROL LINKAGE MECHANISM

[75] Inventors: Eugene G. Hayes, Beaver Dam; Jon M. Patterson, Wauwatosa, both of Wis.

[73] Assignee: Deere & Company, Moline, Ill.

[21] Appl. No.: 715,205

[22] Filed: Jun. 14, 1991

[51] Int. Cl.⁵ ............................................. G05G 1/14
[52] U.S. Cl. ............................. 74/512; 74/481; 74/474; 56/15.8; 280/481
[58] Field of Search ............... 74/512, 513, 527, 474, 74/478, 483; 192/99 S, 4 C; 56/15.8, 15.9, 15.2; 280/405 B, 481, 496; 403/263

[56] References Cited

U.S. PATENT DOCUMENTS

| | | | |
|---|---|---|---|
| 1,511,132 | 10/1924 | Marston | 74/474 |
| 2,971,618 | 2/1961 | Morse | 74/483 R |
| 3,766,802 | 10/1973 | Shellhause | 74/512 |
| 4,194,720 | 3/1980 | Callaghen et al. | 74/478 |
| 4,298,108 | 11/1981 | Hutchison | 192/13 |
| 4,496,035 | 1/1985 | Wanie | 74/474 |
| 4,620,575 | 11/1986 | Cuba et al. | 192/4 C |
| 4,628,757 | 12/1986 | Kaesgen | 74/474 |
| 4,694,942 | 9/1987 | Ogano et al. | 192/99 S |
| 4,723,933 | 2/1988 | Marto | 74/527 |
| 4,747,257 | 5/1988 | Hutchison | 56/15.8 |
| 4,771,856 | 9/1988 | Hutchison et al. | 180/333 |
| 4,896,736 | 1/1990 | Smith | 74/512 |
| 4,958,532 | 9/1990 | Lin | 74/502.2 |

OTHER PUBLICATIONS

Publication entitled "Service Manual 1977 Chevrolet" and published in about 1977, front cover, pp. 7C-2, 7C-9 and 7C-10.

Publication entitled "1969 Car Shop Manual" and authored by Ford Motor Co. in about 1969, front cover and page 05-03-01.

"Preliminary Feasibility Study" containing information generated and provided by employees of The Dow Chemical Co. and Deere & Co., pp. 1-205, including 4 (four) sublettered pages, co-generated prior to 1 Sep. 1989 and confidentially shared between Dow and Deere in the U.S.

Deer & Co., parts catalog entitled: "RX63, RX73, RX75, SX75, RX95, SX95 Riding Mowers", published in the U.S. in Jan. 1989, p. 50-58.

Primary Examiner—Carl D. Friedman
Assistant Examiner—Winnie Yip

[57] ABSTRACT

A mechanism for coupling a vehicle control such as a foot pedal to a vehicle component such as a brake. The mechanism includes a rod member coupled to shift the component between operating modes, and having a rounded end portion. The control includes a recessed portion in abutment with the rounded end portion of the rod. A spring biases the rod into and against the recessed portion such that the rod is supported or carried by the recessed portion. Guides are formed in the vehicle frame for aligning the rod with the recessed portion during the process of manufacture.

16 Claims, 3 Drawing Sheets

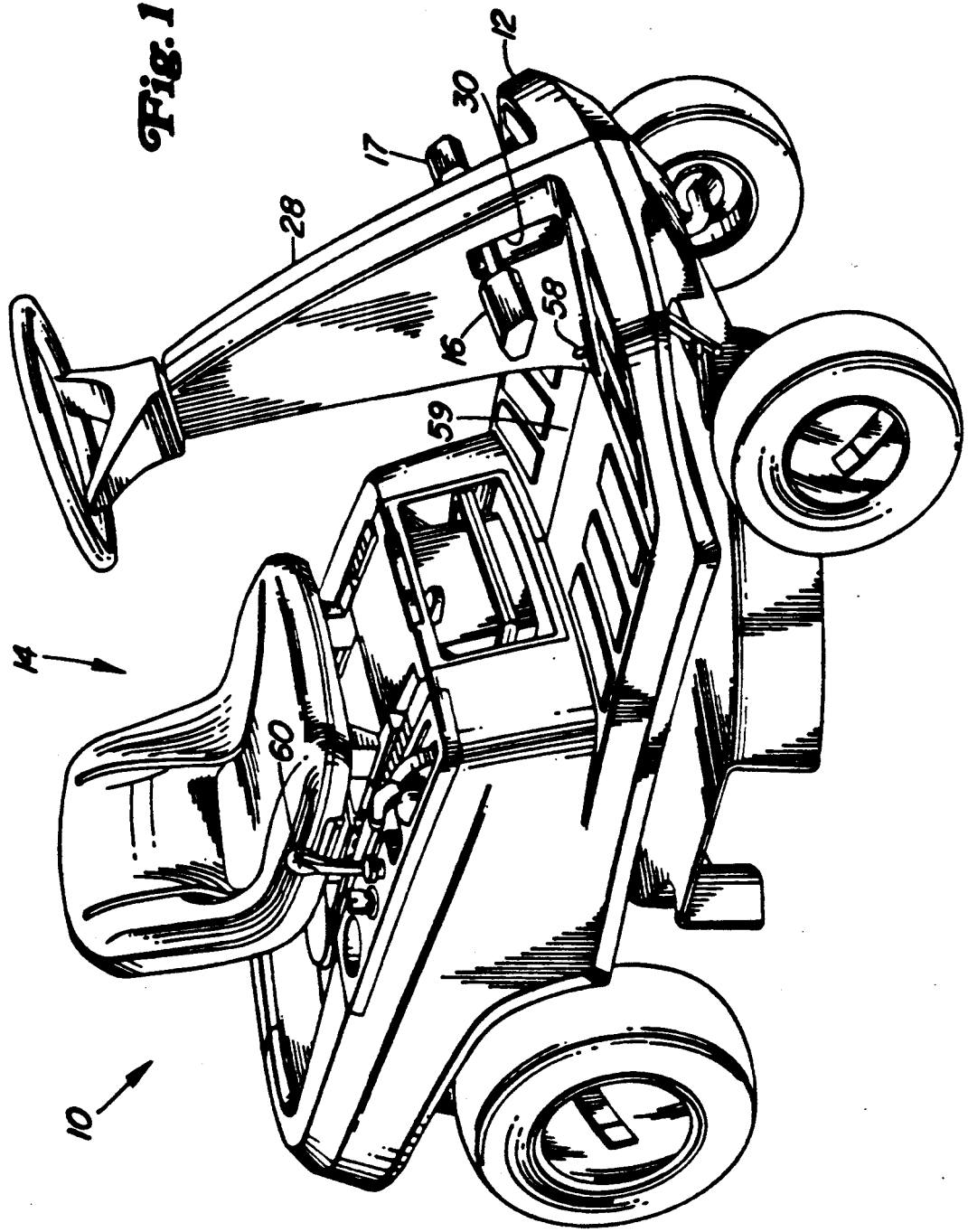

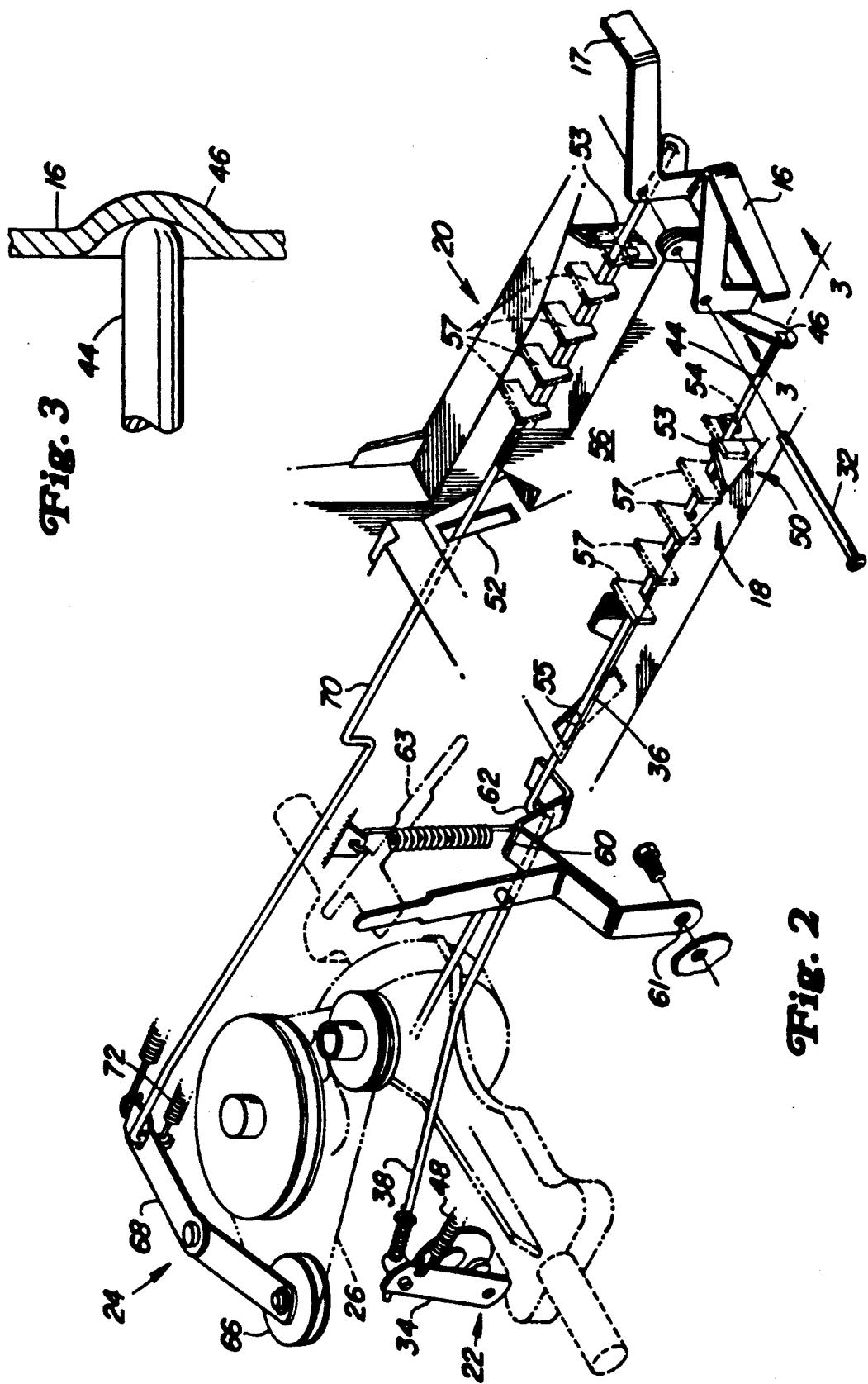

5,201,240

VEHICLE CONTROL LINKAGE MECHANISM

BACKGROUND OF THE INVENTION

1. Field of the Invention

The present invention relates to linkage mechanisms that extend between a vehicle control such as a foot pedal, and a vehicle component such as a brake or clutch device.

2. Description of the Related Art

Conventional vehicles such as rider lawn mowers provide controls such as pedals that the operator can engage to control or operate the vehicle. The controls are operatively coupled to various vehicle components, such as the brakes, the engine, or a clutch mechanism. The linkages between the pedal and the vehicle component often include a rod that extends therebetween. The rod is supported at one of its ends by the component, and at its other end by the pedal. The rod is coupled to the pedal such that as the pedal pivots, the rod will be pushed or pulled to thereby alter the mode of the component.

The connection of the rod to the pedal often involves the use of a plurality of parts. Typically, the rod has a bend formed at one end thereof that is pivotally received by a hole or opening in the pedal. A cotter pin is often used to secure the bend portion of the rod within the pedal opening. The bend in the rod is positioned within the opening in the pedal during the manufacturing process, and the cotter pin is then attached to the rod. The rods and their connections to the pedals are often positioned beneath the frame of the vehicle, such that the person assembling the vehicle has access to the location whereat the rod must be coupled to the pedal. Assembly of conventional rod and pedal mechanisms is therefore relatively easy and simple.

However, it may be desirable to provide a vehicle frame that is at least partially enclosed, and therefore the location at which the rod is to be coupled to the pedal may be inaccessible or blocked from the vision of the assembler. It would be difficult if not impossible to assemble the conventional linkage mechanisms described above on a vehicle having such an enclosed frame. Openings could be formed in the otherwise enclosed frame, but such openings might be costly to install, and might weaken the structure of the frame.

Therefore, it would be desirable to provide a mechanism for linking a vehicle control such as a foot pedal to a vehicle component, such as a brake or clutch. It would be desirable for the linkage mechanism to be easily assemblable on a vehicle having an enclosed frame. It would be desirable to provide a linkage mechanism that is capable of being installed in an area within the frame that is relatively inaccessible and blocked from the view of the assembler.

SUMMARY OF THE INVENTION

The preferred embodiment of the present invention provides a mechanism for use with a vehicle having a frame and at least one vehicle component selectively shiftable between a plurality of modes for controlling vehicle operation. The mechanism includes a rod operatively coupled with the vehicle component, and shiftable in first and second opposite directions for shifting the vehicle component between modes. The rod according to the preferred embodiment has a rounded end portion that is received and supported by a recessed portion of a control. A ball and socket type of connection is thereby provided between the rod and the control. The control of the preferred embodiment is a foot pedal carried by the vehicle frame, and is selectively pivotable by the operator to push the rod in the second direction. As the operator depresses the pedal, the recessed portion of the pedal pivots to push the rod and thereby alter the mode of the component. A biasing mechanism or spring is also provided for securing the end portion of the rod within the recessed portion of the pedal. Guide mechanisms loosely support the rod during operation, and act to maintain the rod in general alignment with the recessed portion of the pedal if and when the rod becomes disengaged or out of abutment with the recess. In addition, the guides of the preferred embodiment guide the rod into abutment with the recess when the mechanism is being assembled, such that assembly of the linkage can occur in an inaccessible area within the vehicle frame.

BRIEF DESCRIPTION OF THE DRAWINGS

FIG. 1 shows a vehicle with which the preferred embodiment of the present invention may be used.

FIG. 2 is a partial perspective view of the preferred embodiment of the present invention with a portion of the vehicle frame not shown for the purpose of clearly illustrating the contents of the compartment. The transmission is shown in phantom lines.

FIG. 3 is an enlarged side view of the rod end in engagement with the recessed portion of the control pedal.

DESCRIPTION OF THE PREFERRED EMBODIMENT

Figure 4:
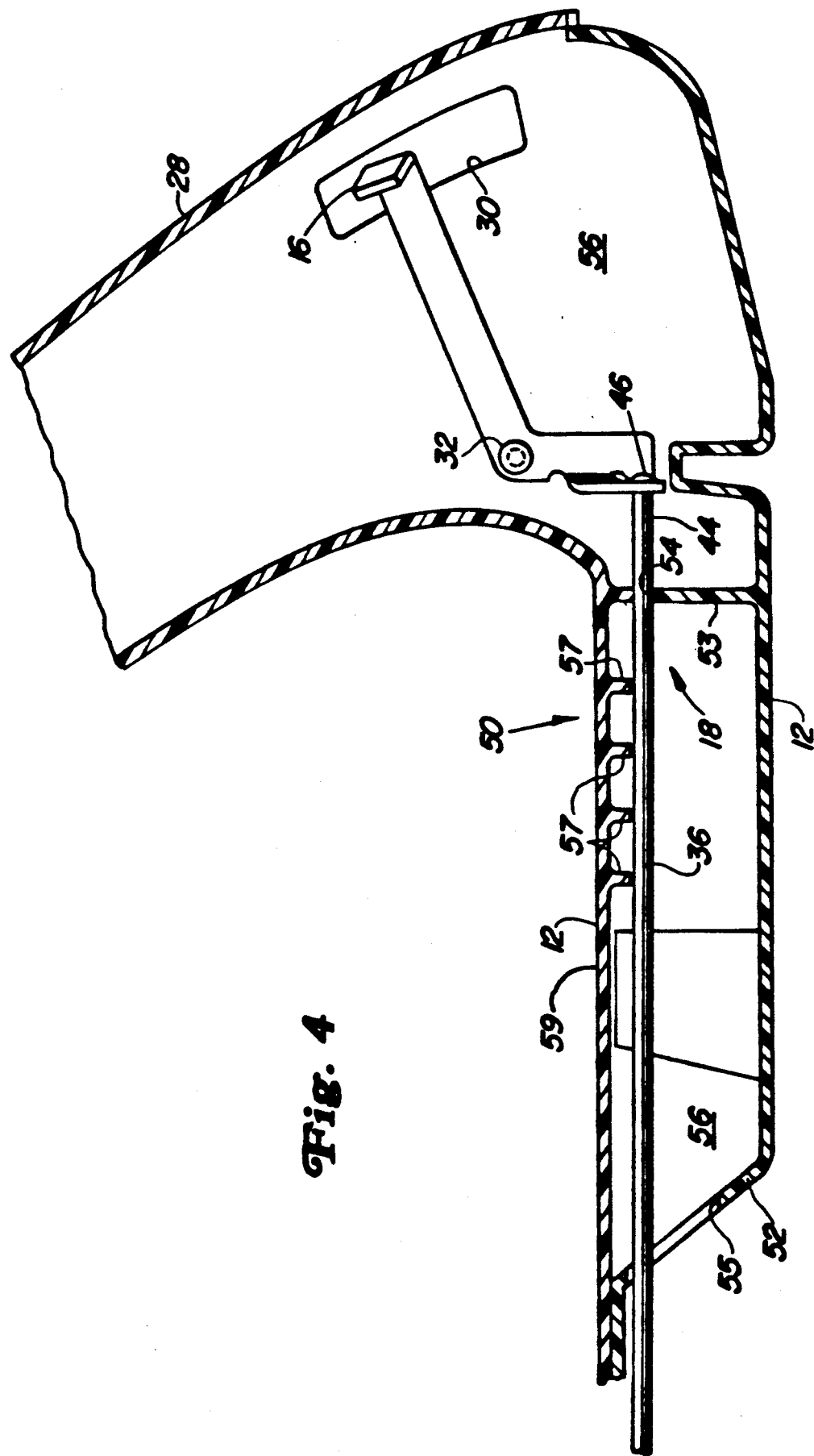
FIG. 4 is a sectional view of the vehicle showing the brake pedal and its connection with the brake rod within the frame.

Referring now to FIG. 1, there is shown a vehicle 10 with which the preferred embodiment of the present invention may be used. The vehicle 10 provides a frame 12, and an operator station 14 whereat an operator manipulates controls such as foot pedals 16 and 17 for guiding and controlling the vehicle 10. Linkage mechanisms 18 and 20, as best seen in FIG. 2, operatively couple the controls with respective components carried at the rear of the vehicle 10. The components include a brake mechanism 22, and a belt clutch 24 for releasing the driving tension in a drive belt 26. The vehicle frame 12 according to the preferred embodiment is made of a plastic material and forms a generally enclosed structure, as best seen in FIG. 4, for increasing the rigidity and strength of the structure.

Referring now to FIG. 2, there is shown a pair of controls 16 and 17 carried by the frame 12 of the vehicle and engagable by the operator to control the vehicle 10. The controls 16 and 17 according to the preferred embodiment are foot pedals located on either side of the vehicle steering column 28. FIG. 2 shows the foot pedals 16 and 17 in their fully depressed positions. The operator's right pedal 16 is coupled with the vehicle brakes 22, and the operator's left pedal 17 is coupled with the belt clutch 24. Openings 30, as seen in FIG. 1, are formed on both sides of the steering column 28 through which the pedals 16 and 17 extend. A transversely extending pin member 32 supports the pedals 16 and 17 within the steering column 28.

A pair of linkages 18 and 20 extend between the pedals 16 and 17 and the respective components 22 and 24.

The two linkages 18 and 20 are similar in structure and function, and therefore only the brake pedal linkage 18 will be described in detail. An arm member 34 is coupled with the brake 22 at the rear of the vehicle 10, and pivots to actuate the brake 22. A rod 36 has a rear portion 38 that is coupled with the arm member 34. The rod 36 extends forwardly from the arm member 34, and includes a forward portion 44 in abutment with a recessed portion 46 of the pedal 16. According to the preferred embodiment, the forward end 44 of the rod 36 is rounded, and is in abutment with a spherical socket or recess 46 formed in the lower portion of the pedal 16. A biasing tension spring 48 is coupled between the arm member 34 and the frame 12, and acts to urge the arm member 34 and rod 36 forwardly. The arm member 34 and brake 22 are therefore biased to assume a disengaged mode, and the rod 36 is urged into secure engagement with the recess 46 in the pedal 16. The spring 48 serves to press the rod 36 against the recess 46 to such an extent that the weight of the rod 36 is supported or carried by the recess 46 formed in the pedal 16.

Guide means 50, as seen in FIGS. 2 and 4, is provided according to the preferred embodiment, and includes a plurality of members 52 and 53 formed integral with the frame 12 for defining openings 54 and 55 through which the rod 36 is received. The members 52 and 53, and ribs 57 formed integral with the frame 12 act to direct the rod 36 during the assembly process. The guide members 52 and 53 also act to support the rod 36 if and when the rod 36 becomes disengaged from the recess 46 formed in the pedal 16. However, when the rod 36 is securely received within the recess 46, the guides 50 only slightly contact the rod 36. Friction is thereby reduced between the guides 50 and the rod 36 such that the probability of the rod 36 being blocked from shifting is reduced.

Next, the assembly of the preferred embodiment will be discussed. The first step in the manufacture of the preferred embodiment is the assembly of the frame 12. A plurality of plastic or composite pieces are joined together to form a frame 12 that provides generally enclosed portions. These enclosures or box sections act to increase the strength and rigidity of the frame such that a plastic frame may be utilized. A generally enclosed compartment 56, as best seen in FIGS. 2 and 4, is formed at the front of the vehicle frame 12 for supporting the pedals 16 and 17 within the operator station 14. FIG. 4 is a sectional side view taken along the centerline of the vehicle and showing the enclosed compartment 56 which is defined by the frame 12. The compartment 56 is formed at the base of a steering column 28 that encloses a steering shaft (not shown). The compartment 56 extends rearwardly from the base of the steering column 28 and beneath where the operator rests his feet during vehicle operation. As best seen in FIG. 1, the operator can rest his feet on top wall 59 which is defined by a portion of the frame 12. As best seen in FIG. 4, the top wall 59 defines the top portion of the enclosed compartment 56, and is not shown in FIG. 2 for the purpose of illustrating the contents of the compartment 56. Member 52, as best seen in FIGS. 2 and 4, extends laterally across a substantial portion of the width of the vehicle and defines the rear wall of the compartment 56. To couple the pedals 16 and 17 to the frame 12, one pedal is inserted through a respective opening 30 in the steering column 28. The pin member 32 is then inserted through the pin support opening 58 formed in the steering column 28, and inserted through the opening in the pedal 16. The other pedal 17 is then inserted through the opening 30 on the other side of the steering column 28, and the pin member 32 is extended through the second pedal 17 and the full width of the steering column 28.

Next, the rods 18 and 20 must be operatively coupled between the components 22 and 24 and the pedals 16 and 17. The compartment 56 formed by the frame 12 which carries the pedals 16 and 17 is generally enclosed. However, the rear of the vehicle frame 12 is generally open. The rods 36 must be fed into the rearward openings during assembly in order to position the rods 36 in operative engagement with the pedals. The vehicle frame is positioned upside-down during the process of attaching the various linkages to the frame 12. The rearmost guide member 52 is defined by the rear wall of the compartment 56, and provides a relatively large slot or opening 55 for receiving the rod 36. Once inserted into the rearmost guide member 52, the rod 36 must be pushed further forwardly. The operator must shift the rod 36 across a series of ribs 57 formed integral with the top wall of the compartment 56. The elevation of the ribs 57 gradually changes in order to guide or feed the rod 36 into the opening 54 in the forward guide member 53. The elevation of the ribs 57 changes so gradually however, that as the front portion 44 of the rod shifts forwardly, the rounded end of the rod 36 engages the very edge of each rib 57, such that the rounded end portion 44 deflects the rod to a position whereat the rod 36 can pass beyond the rib 57. This slight deflection of the rod 36 occurs as the rounded end portion 44 encounters the edge of each rib 57. In this way, the rod 36 is guided into position to be received by the opening 54 in the forward guide member 53 with relative ease by the assembler. The forward guide member 53 provides a relatively small opening, such that the forward guide member 53 accurately aligns the front end 44 of the rod 36 as the rod 36 is shifted forwardly during assembly.

Once positioned within the forward guide member 53, the rod 36 can be pushed forwardly into abutment with the pedal 16. The forward and rearward guide members 52 and 53 in combination with the ribs 57 act to align the front end 44 of the rod 36 for abutment with the recessed portion 46 of the pedal 16 as the rod 36 shifts forwardly. If the rod 36 does not contact the exact center of the recess 46, the spherical recess itself will act to center the rod end within the recess as the rod 36 is pushed further forwardly. Therefore, the guides 50 and recess 46 act to accurately direct the rod 36 into the correct operating position. Once the rod 36 is positioned in the correct location against the pedal 16, the rear portion 38 of the rod 36 can be coupled with the arm member 34. Finally, a tension spring 48 is coupled between the arm member 34 and the frame 12 for biasing the arm member 34 and rod 36 forwardly.

Next, the operation of the preferred embodiment of the present invention will be discussed. When the operator is not depressing the pedal 16, the spring 48 biases the arm member 34 forwardly to shift the brake 22 to a disengaged or released mode. The spring 48 also acts to bias the rod 36 into abutment with the recess 46 formed in the pedal 16. The rod 36 is pressed against the recess 46 to such an extent that the rod 36 is carried or supported by the recess 46. Therefore, when the operator is not depressing the pedal 16, the rod 36 is being carried at its rearward end 38 by the arm member 34, and at its forward end 44 by the recessed portion 46 of the pedal 16. The guides 50 do not serve to support or carry the rod 36 within the frame 12, but rather contact the rod 36 only slightly when the pedal 16 is not being depressed.

During operation, the operator can depress the pedal 16 to apply the brakes 22 to the vehicle 10. As he depresses the pedal 16, the pedal 16 pivots about the pin member 32, and the recessed portion 46 shifts rearwardly. The rod 36 positioned against the recess 46 is thereby shifted rearwardly within the guides 50. As the rod 36 shifts to the rear, the arm member 34 pivots rearwardly, which causes the brake 22 to assume an engaged mode. The operator must apply a force to the pedal 16 to overcome the biasing force of the tension spring 48. The spring 48 acts to secure the rod 36 against and within the recess 46 as the pedal 16 is being depressed. Therefore, the rod 36 is carried by the recessed portion 46 of the pedal 16 and the arm member 34 when the rod 36 shifts in response to depression of the pedal 16. The guides 50 do not act to support or carry the rod 36 as the rod 36 is shifting, but rather contact the rod 36 only slightly. Since the rod 36 is not extensively carried by the guides 50, excessive friction or other blockage between the rod 36 and the guides 50 that might prevent or block the rod 36 from shifting is reduced or eliminated.

When the operator releases the pedal 16, the tension spring 48 shifts the rod 36 forwardly, thereby pivoting the arm member 34 to shift the brake 22 to a released mode. Also, as the rod 36 shifts forwardly, the front end portion 44 of the rod 36 will force the pedal 16 to pivot to its released position. The rounded rod end 44 maintains its engagement with the recessed portion 46 of the pedal 16 throughout its forward shifting, and therefore the rod 36 remains supported between the arm member 34 and the recess 46.

The preferred embodiment of the present invention provides a parking brake feature that can be applied when the operator depresses the brake pedal 16. With the brake pedal 16 depressed and the rod 36 shifted rearwardly, the operator can shift a lever 60 laterally outwardly within a slot 63 formed in the frame 12, and about a pivotal connection 61 with the frame 12. As the lever 60 pivots outwardly, a portion of the lever shifts upwardly into abutment with an offset portion 62 formed in the rod 36. The lever 60 blocks the rod 36 from returning forwardly, and the arm member 34 and brake 22 are prevented from returning to a released mode. The parking brake lever 60 therefore acts to block the brake 22 in an applied or braked mode. When the parking brake is engaged as described above, the spring 48 presses the offset portion 62 of the rod 36 against the parking brake lever 60, and therefore no longer presses the rod 36 into abutment with the recess 46 in the pedal 16. With the parking brake engaged, the operator can then release his foot from the brake pedal 16. The brake pedal 16 will not spring up to the released position, since the rod 36 is being held rearwardly by the parking brake lever 60. The brake pedal 16 will therefore remain pivoted forwardly under the force of its own weight, and the recessed portion 46 will pivot rearwardly to contact the front portion 44 of the rod 36. However, the rod 36 is no longer being forced into engagement with the recess 46, and therefore the recess 46 is not supporting the front portion 44 of the rod 36 when the parking brake is engaged. The guide members 52 and 53 act to support the front portion 44 of the rod 36 when the parking brake is applied. The guides 50 act to maintain the rod 36 in proper alignment with the recess 46 such that when the parking brake is released the rod 36 will accurately shift into operative abutment with the recess 46 again.

The rod 36 positioned on the vehicle operator's right side has been described above, and is coupled between the operator's right foot pedal 16 and the vehicle brake 22. The left foot pedal 17 is similarly coupled to a belt drive clutch mechanism 24 located at the rear of the vehicle 10. A drive belt 26 operatively couples the vehicle power source with a transmission input pulley. A tensioner pulley 66 acts to place tension in the drive belt 26 to transfer energy from the power source to the transmission input pulley. The tensioner pulley 66 can also shift to loosen or untension the belt 26 to thereby interrupt the transmission of power. A pivot arm 68 is provided for swinging the tensioner pulley 66 between its tensioning and untensioning modes. A rod 70 is coupled with the pivot arm 68, and is linked with the left foot pedal 17 according to the present invention. A biasing spring 72 is coupled to the pivot arm 68 for urging the pivot arm 68 and rod forwardly.

I claim:

1. A mechanism for use with a vehicle, said vehicle having at least one vehicle component selectively shiftable between a plurality of modes by the operator for controlling vehicle operation, said vehicle having a compartment which is generally inaccessible to an operator, said mechanism comprising:

rod means operatively coupled with the vehicle component, said rod means being shiftable in first and second opposite directions for shifting the vehicle component between modes, said rod means also having an end portion;

a control pivotally carried by the vehicle frame and having a recessed portion positioned within the generally inaccessible compartment during operation for receiving and supporting the end portion of the rod means, said control being selectively pivotable by the operator to push the rod means in the second direction;

guide means carried within the compartment for guiding the rod means into alignment with the recessed portion when the rod means has become disengaged from the recessed portion;

means for biasing the rod means in the first direction for securing the end portion of the rod means within the recessed portion, said biasing means being positioned outside of the inaccessible compartment and spaced from the end portion and recessed portion.

2. The invention of claim 1, wherein the guide means loosely and slidably guides the rod means into progressively closer alignment with the recessed portion as the rod means shifts toward the recessed portion.

3. The invention of claim 2, wherein said guide means prevents said rod means from shifting out of general alignment with the recessed portion of the control means when the rod means shifts out of abutment with the recessed portion of the control means.

4. The invention of claim 2, wherein said guide means includes a member carried by the vehicle frame, and defines an opening for loosely and slidably guiding the rod means.

5. The invention of claim 1, wherein:

the end portion of the rod means includes a rounded portion abuttable with the recessed portion of the control; and the recessed portion of the control further comprises a rounded socket for receiving the rounded portion of the rod means.

6. The invention of claim 1, wherein:

the vehicle component further comprises an arm member pivotable in the first and second directions to shift the mode of the component, said arm member being coupled with the rod means for pivoting as the rod means shifts; and the biasing means further comprises a spring operatively coupled with the arm member for biasing the arm member in the first direction.

7. The invention of claim 6, wherein the spring operatively acts to press the end portion of the rod means against the recessed portion of the control with sufficient force for the recessed portion to support the weight of the rod means.

8. The invention of claim 1, wherein the control further comprises a foot actuated pedal.

9. The invention of claim 1, wherein said biasing means is positioned outside of the generally enclosed and inaccessible compartment.

10. The invention of claim 1, wherein the generally inaccessible compartment further comprises a generally enclosed portion of the frame.

11. A mechanism for use with a vehicle, said vehicle having at least one vehicle component selectively shiftable between a plurality of modes by the operator for controlling vehicle operation, said vehicle having a frame which includes a generally enclosed compartment which is unopenable and generally inaccessible to an operator, said mechanism comprising:

an arm member coupled with the component and pivotable in first and second opposite directions to shift the mode of the component, rod means operatively coupled with the arm member, said rod means being shiftable in the first and second opposite directions for shifting the vehicle component between modes, said rod means also having an end portion;

a foot actuated pedal control pivotally carried by the vehicle frame and having a recessed portion having a socket positioned within the generally inaccessible compartment during operation for receiving and supporting the end portion of the rod means, said foot actuated pedal control being selectively pivotable by the operator to push the rod means in the second direction;

guide means positioned within the compartment for loosely and slidably guiding the rod means, wherein said guide means prevents said rod means from shifting out of general alignment with the recessed portion of the foot actuated pedal control means when the rod means shifts out of abutment with the recessed portion of the foot actuated pedal control means;

spring means operatively coupled with the rod means for compressing and biasing the rod means toward the control to secure the end portion of the rod means within the recessed portion, said spring means being located outside of the generally enclosed compartment and remote from the end portion and socket.

12. The invention of claim 11, wherein the generally inaccessible compartment further comprises a generally enclosed portion of the frame.

13. A mechanism for controlling a vehicle component having a plurality of modes, said vehicle including a generally enclosed and inaccessible compartment, said mechanism comprising: a rod means for operatively coupling the component with a pivotable control carried by the vehicle and engagable by the operator to shift the mode of the component, said rod means having a first end portion pivotally supported by the component, and having a second end portion received by a recessed portion of the control, said second end portion and recessed portion being positioned within the generally enclosed compartment during operation, and biasing means for compressing the rod means and urging the second end portion of the rod means to shift toward the control and into engagement with the recessed portion for securing the second end portion within the recessed portion, said biasing means being positioned outside the generally enclosed compartment, and guide means carried within the compartment for guiding the rod means into alignment with the recessed portion when the rod means has become disengaged from the recessed portion.

14. A mechanism for use with a vehicle, said vehicle having a frame and at least one vehicle component selectively shiftable between a plurality of modes by the operator for controlling vehicle operation, said mechanism comprising:

an arm member coupled with the component and pivotable in the first and second direction to shift the mode of the component;

rod means operatively coupled with the arm member, said rod means being shiftable in first and second opposite directions for shifting the arm member between modes, said rod means also having an end portion;

a control pivotally carried by the vehicle frame and having a recessed portion for receiving the end portion of the rod means, said control being selectively pivotable by the operator to push and compress the rod means in the second direction;

a generally inaccessible compartment within the vehicle and within which the end portion and recessed portion are located;

means for biasing the rod means in the first direction toward the control for securing the end portion of the rod means within the recessed portion, said biasing means operatively compressing the rod means and pressing the end portion against the recessed portion of the control with sufficient force for the recessed portion to support the weight of the rod means, said biasing means being located remotely from the end portion and recessed portion; and guide means positioned within the generally inaccessible compartment for loosely and slidably guiding the rod means into progressively closer alignment with the recessed portion as the rod means shifts toward the recessed portion; said guide means preventing said end portion from shifting out of general alignment with the recessed portion of the control means when the end portion shifts out of abutment with the recessed portion of the control means.

15. The invention of claim 14, wherein the biasing means further comprises a spring operatively coupled with the arm member for biasing the arm member in the first direction.

16. The invention of claim 14, wherein the generally inaccessible compartment further comprises a generally enclosed portion of the frame.

* * * * *